UNITED STATES PATENT OFFICE.

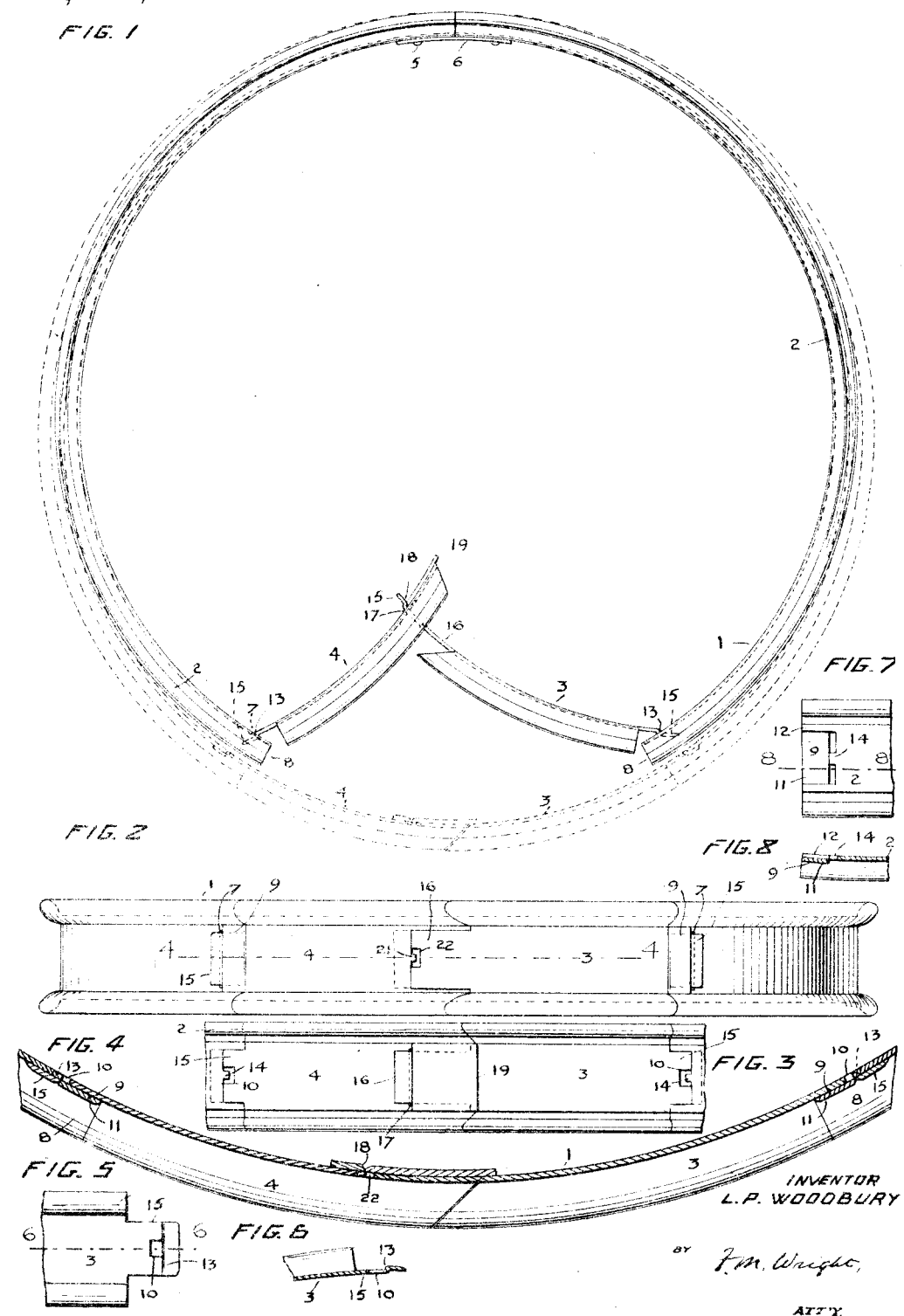

LEONARD P. WOODBURY, OF BERKELEY, CALIFORNIA, ASSIGNOR OF ONE-HALF TO JEAN T. PARKER, OF SAN FRANCISCO, CALIFORNIA.

DEMOUNTABLE RIM.

1,201,129.  Specification of Letters Patent.  Patented Oct. 10, 1916.

Application filed May 31, 1916. Serial No. 100,838.

*To all whom it may concern:*

Be it known that I, LEONARD P. WOODBURY, a citizen of the United States, residing at Berkeley, in the county of Alameda and State of California, have invented new and useful Improvements in Demountable Rims, of which the following is a specification.

The present invention relates to improvements in demountable rims for the wheels of vehicles, the object of the invention being to provide a rim of this character which, after being demounted from the wheel of the vehicle, can be readily collapsed so as to permit of the removal therefrom of the pneumatic tire in order to replace said tire by another tire, and can be as readily extended into its circular form to permit its replacement on the wheel.

In the accompanying drawing, Figure 1 is a side view of the rim in its collapsed position; Fig. 2 is an outside view of the same in its extended position; Fig. 3 is a broken inner view of the same; Fig. 4 is an enlarged sectional view of the same; Fig. 5 is a broken plan view, and Fig. 6 is a broken sectional view on the line 6—6 of Fig. 5, of an outer end of a short section; Figs. 7 and 8 are views similar to Figs. 5 and 6 of an outer end of a long section.

Referring to the drawing, 1 indicates an automobile rim having flanges extending obliquely outward. Instead of being continuous throughout its whole circumference, I form said rim of a main rim section 2, comprising two members, and two toggle sections 3 and 4. The inner ends of the members forming the main rim section abut, and are connected by a flat spring 6, attached by suitable means, such as bolts 5. This spring is so constructed and arranged with reference to the members of the main rim section that it tends to draw the other ends of said section inwardly or toward each other. The outer ends of the main rim section 2 are each provided with a transverse slot 7 extending nearly the full width of the rim between the flanges and the outer terminal portion 8, between its end and the slot, is thickened at the marginal portions next to the flanges, as shown at 9, so that the outer surface of said terminal portion is raised above the remainder of the surface of said section, as shown in Figs. 7 and 8. The middle part 11 of said terminal portion corresponding in width with the length of the transverse slot is, however, of a thickness less than the marginal portions 12, being of substantially the same thickness as the main portion of the section, so that there is formed in the middle part of said terminal portion a recess in the inner surface. This recess is adapted to receive a tongue 15 (Figs. 5 and 6) of slightly less width than the slot, and extending from the adjacent end of the section 3 or 4 as the case may be. This tongue extends through the adjacent slot of the section 2, and, where it extends through said slot, is bent to form a shoulder 13 facing rearwardly or toward the section 3 or 4 from which the tongue extends. The extreme end of the tongue, resting upon the outer surface of the section 2, is beveled on its outer edge. Also there extends from the middle of the transverse inner edge of the recess formed in the inner surface of each free end of section 2 a short and narrow lug 14 (Figs. 7 and 8) which enters a hole 10 formed in the center of the tongue 12 of the adjacent section 3 or 4. This short central lug prevents the tongue of the short section 3 or 4 from sliding too far through the slot 7 of the adjacent long section 2, when the latter is turned at an angle with the short section 3 or 4. A somewhat similar arrangement is used for connecting the inner ends of the toggle sections 3 and 4 with each other. From the inner end of the section 3 extends a tongue 16, which passes through a transverse slot 17 formed in the section 4 near its inner end. The tongue, where it extends through the slot 17, is bent inwardly, as shown at 18, in Figs. 1 and 4. The central part of the terminal portion 19 of the section 4 is in a curved surface nearer to the center of the wheel than the remainder of said section 4, so as to form a recess to receive the main portion of the tongue 18 of the section 3. As in the connections between the section 2 and the sections 3 and 4, there is formed on the section 4 a short lug 21 which enters a central hole 22 in the terminal portion of the tongue 16 to limit the inward movement of said tongue through the slot 18.

The tire is removed from the rim in the following manner. The rim is first removed from the wheel, and, it being in the position shown in dotted lines in Fig. 1, pressure is applied to the upper portion of the rim, which pressure has the effect of expanding slightly the outer portions of the main rim section 2 of the rim so as to permit the toggle sections to pass the line between their connections with the main rim section. When this line is passed the spring operates to draw the outer ends of the main rim section together and thereby move the short sections into the position shown in full lines in Fig. 1. The tire can then be readily removed from the rim.

The reasons for connecting the sections with each other by the tongue and slot constructions here shown, are, first, to prevent the device from being rendered inoperative through rust, and, second, on account of cheapness of construction.

The spring i put under tension when the device is expanded to surround a wheel and when it is taken off the wheel contracts the two halves of the main rim section together. However, the amount of contraction created by the spring is but slight, but amply sufficient to cause the connected ends of the toggle members to move inwardly, once said inward movement is initiated by an extraneous force. When the combined sections are in circular form the spring has the effect of retaining them in that form, since the two shorter sections cannot move inwardly without the outer ends of the main rim section, first swinging slightly outward, and the spring opposes this swinging movement of the outer ends of the main rim section outward from one another.

I claim:—

1. A collapsible rim comprising a main rim section formed of two members having abutting ends connected by an intermediate resilient member, toggle sections having their inner ends movably attached to the outer ends of the main section and having their inner ends movably attached to each other, said resilient member acting to move both of the outer ends of the main rim section inwardly to automatically force the connected ends of the toggle sections inwardly after initiation of said inward movement by an extraneous force, said resilient member possessing sufficient strength to prevent collapse of the rim when the toggle sections are in their outer positions.

2. A collapsible rim comprising a main rim section provided with an intermediate resilient portion and having slots adjacent its ends, toggle members movably connected together at their inner ends and having their outer ends provided with tongues entering the slots in the main rim section, and means for preventing disengagement of the tongues and slots.

3. A collapsible rim comprising a main rim section provided with an intermediate resilient portion and having slots adjacent its ends, toggle members movably connected together at their inner ends and having their outer ends provided with tongues entering the slots in the main rim section, said tongues being provided with openings, said main rim section being provided with lugs adjacent said slots and positioned to enter the openings of the tongues to prevent disengagement thereof.

4. A collapsible rim comprising a main rim section provided with an intermediate resilient portion and having slots adjacent its ends, toggle members having tongues at their outer ends extending through said slots, the inner end of one toggle member having a slot, the inner end of the other toggle member having a tongue passed through the last mentioned slot, and means for preventing disengagement of the tongues and slots.

In testimony whereof I have hereunto set my hand in the presence of two subscribing witnesses.

LEONARD P. WOODBURY.

Witnesses:
G. M. BALL,
D. B. RICHARDS.